United States Patent [19]
Khosrowpour et al.

[11] Patent Number: 5,838,073
[45] Date of Patent: Nov. 17, 1998

[54] SIDEBAND COMMUNICATION ON THE STANDARD PARALLEL SCSI BUS

[75] Inventors: Farzad Khosrowpour, Longmont, Colo.; Erik Schuchmann, Austin, Tex.

[73] Assignee: Dell USA, L.P., Round Rock, Tex.

[21] Appl. No.: 786,154

[22] Filed: Jan. 21, 1997

[51] Int. Cl.⁶ ........................................... H02J 3/02
[52] U.S. Cl. .................. 307/2; 340/310.02; 340/310.07; 395/750.02
[58] Field of Search .................... 307/1, 2, 4, 5, 307/130; 395/750.01, 750.02, 750.03; 340/310.01, 310.07, 310.02; 455/47

[56] References Cited

U.S. PATENT DOCUMENTS

| | | | |
|---|---|---|---|
| 4,540,890 | 9/1985 | Gangemi et al. | 307/1 |
| 5,081,440 | 1/1992 | Ott et al. | 340/310.01 |
| 5,489,809 | 2/1996 | Kaya et al. | 340/310.01 |
| 5,670,931 | 9/1997 | Besser et al. | 340/310.01 |
| 5,684,826 | 11/1997 | Ratner | 340/310.01 |

OTHER PUBLICATIONS

Messmer, Hans–Peter, *The Indispensable PC Hardware Book*, Your Hardware Questions Answered, Chapter 28, Sections 7.1 through 7.6, Addison–Wesley Publishing Company, Inc., Second Edition, 1995, pp. 806–832.

*Primary Examiner*—Richard T. Elms
*Attorney, Agent, or Firm*—Skjerven, Morrill, MacPherson, Franklin & Friel; Ken J Koestner

[57] ABSTRACT

A power supply line of a communications interface provides communication between two devices when one device is unable to utilize the communications interface in a standard manner. The power supply line is specified to operate within a first voltage range and normally operates at a first voltage within a second voltage range, the second voltage range being within the first voltage range. A voltage circuit changes the power supply line to a second voltage outside of the second voltage range but within the first voltage range. A voltage detecting circuit coupled to the power supply line asserts a signal indicating when the second voltage is present on the power supply line, thereby providing communication between the first device and the other device.

30 Claims, 3 Drawing Sheets

SIDEBAND COMMUNICATION ON THE STANDARD PARALLEL SCSI BUS

BACKGROUND OF THE INVENTION

1. Field of the Invention

This invention relates to communication over a standard bus and more specifically, to providing additional communication capability over an existing bus line.

2. Description of the Related Art

In certain situations, a Small Computer Systems Interface (SCSI) device or SCSI enclosure containing one or more SCSI devices may be powered down in response to a command on the SCSI bus. The main SCSI controller may be required, in some circumstances, to communicate with the device or enclosure that has powered down, and instruct the device or enclosure to power back up. It is also possible that the SCSI device or enclosure has been unexpectedly shut off and the main SCSI controller needs to identify if this is due to a local power supply failure of the device or enclosure. When a device or group of devices have powered down intentionally or otherwise, it can be difficult to communicate with the device(s) via a SCSI command since the device(s) have little or no power and are generally in the off state. When a device has powered down intentionally, it is possible that the device is operating using standby (flea) power in a low power mode. However, in order to participate on the SCSI bus, most SCSI implementations require at least a microcontroller, a SCSI interface chip, and possibly external memory as well. Such implementations impose a substantial power requirement likely to exceed available flea power.

Additionally, in a single ended (non differential) SCSI implementation, such a configuration may need to protect against backflow power to a system which is shut down, e.g., by the use of diodes, and this will add further to the complexity of the circuits. It would also be possible to have the devices or enclosures use backup power, e.g., batteries, but the use of rechargeable batteries is expensive and requires additional protection and charge circuits and also may require regulatory approvals depending upon the application.

Another way to provide a power-on signal that could be sent from a SCSI controller to SCSI device(s) is to use a different physical signal line, i.e., a signal line that is separate from and in addition to the defined SCSI interface signal lines. However, such an approach is not desirable because using additional non-standard signal lines is generally costly.

Therefore it would be desirable to provide a communications channel between the SCSI controller and the SCSI device when the device is in the off or power down state to provide for, e.g., restoration of power to the SCSI device or enclosure. Such a configuration ideally would require no additional cables due to the desire to use the SCSI Accessed Fault-Tolerant Enclosures, (SAF-TE) or SCSI Enclosure Specification (SES) specification.

SUMMARY OF THE INVENTION

The invention provides a low cost signaling capability. The invention utilizes a low cost solution using AC superposition on the standard SCSI TERMPWR line. The invention provides for devices or enclosures in the low power or power down mode to be powered from the TERMPWR line and at the same time allows the controller to issue commands, all over a single preexisting SCSI signal line. The communications from the SCSI main controller can range from a single pulse causing the device or enclosure to power-on, to more sophisticated single wire communication protocols for environmental management or power sequencing.

Accordingly the invention provides a method and apparatus for communicating from a first device to a second device or enclosure over a power supply line of an interface, where the interface includes both signaling lines and the power supply line and wherein the power supply line is specified to operate within a first voltage range, and wherein the power supply line normally operates at a first voltage within a second voltage range and the second voltage range is within the first voltage range. A voltage circuit changes the power supply line to a second voltage according to a control signal, the second voltage being outside of the second voltage range, but within the first voltage range. A voltage detecting circuit coupled to the power supply line asserts a signal indicating when the second voltage is present on the power supply line, thereby providing communication capability between the first device and at least one other device.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 1:
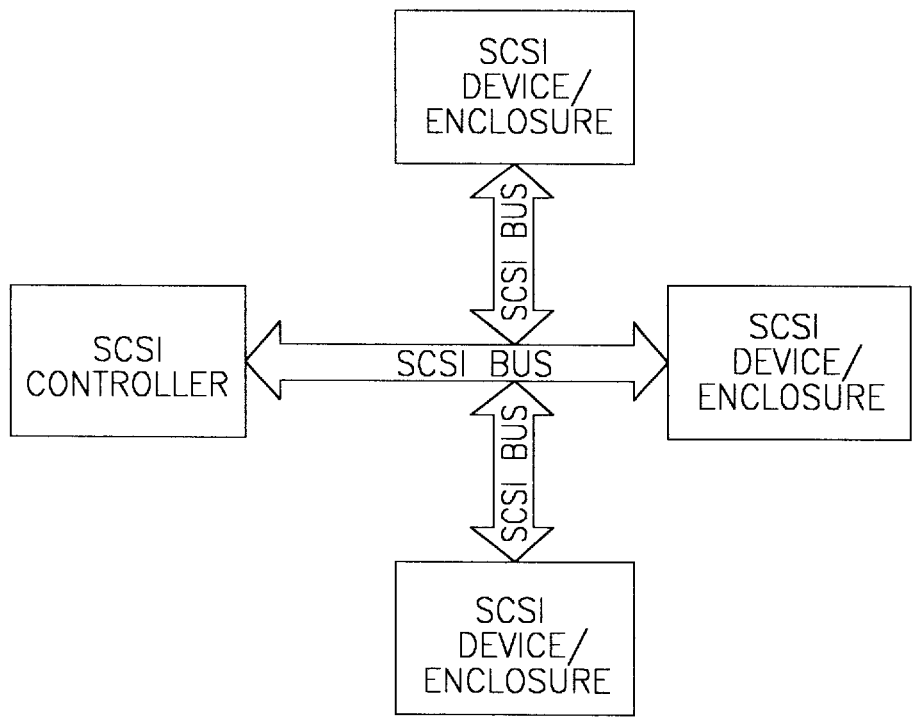
FIG. 1 shows a high level block diagram of a SCSI environment.

In an environment where devices are connected to a communications interface such as the SCSI bus, shown e.g, in FIG. 1, in order to communicate with a device that is turned off, that is operating with standby power or that has failed, it is necessary both to supply power to such a device as well as to provide a signaling path to alert the device to power up to a state so that the device can be accessed over the normal communications interface, e.g., the SCSI bus. One preferred embodiment, according to the invention provides a one line solution to communicate to a powered-down device, using an existing line of the SCSI interface. The SCSI interface includes a line for termination power called TERMPWR, specified to operate between 4.25 V and 5.25 V DC. For additional details on the SCSI specification, refer to the SCSI-II specification which is incorporated herein by reference. The line TERMPWR, can be utilized in a manner according to the present invention, such that older devices, which do not support the new protocol defined herein, are not affected, while devices supporting the protocol have a new low-cost communications link.

Figure 2:
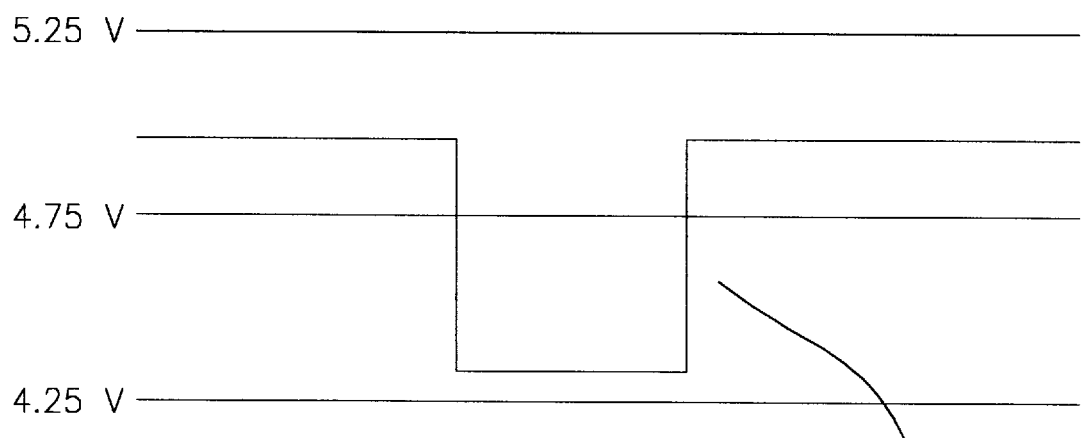
FIG. 2 shows voltages utilized in one embodiment of the invention.

Specifically, TERMPWR can provide a distributed source of power to devices in the power down mode. Additionally, TERMPWR can be used as a signaling path by superimposing an AC signal on it. TERMPWR must always operate within the specifications of the SCSI bus. Devices supporting the present invention, expect TERMPWR to operate within a second voltage range that is narrower than the specified range. That is illustrated in FIG. 2. Specifically, if TERMPWR is guaranteed to operate at a narrower voltage range, but still within the SCSI specifications, e.g., between 4.75 V and 5.25 V, then the voltage range between 4.25 and 4.75 V can be used for communications. Therefore, an AC signal, e.g., pulse 200, with a maximum swing between 4.25 V (low) and 4.75 V(high) can be superimposed on the TERMPWR line where it is unseen by non-supporting devices and interpreted by a supporting device as a communications signal. For instance, in a simple application, the pulse could indicate to a SCSI device or a SCSI enclosure which provides power to a number of SCSI devices which are in a power down mode, to power up and await instructions on the SCSI bus. Note that the device that is being communicated with is not necessarily a SCSI device. That is, the device may not have a SCSI ID. For instance, the device detecting the pulse may be the enclosure which supplies power to a number of SCSI devices.

The pulse 200 would not affect a supporting device that was already in a power up mode. In its simplest embodiment, a single pulse 200 of a predetermined width, e.g., 0.25 microseconds can be used to provide a power on signal to a supporting device. Ideally, the pulse width should be small enough that LC filter 317 can eliminate the pulse so that it is not seen by the terminators of the SCSI devices. Other, more complex signaling protocols can also be utilized by using a series of pulses.

Figure 3A:
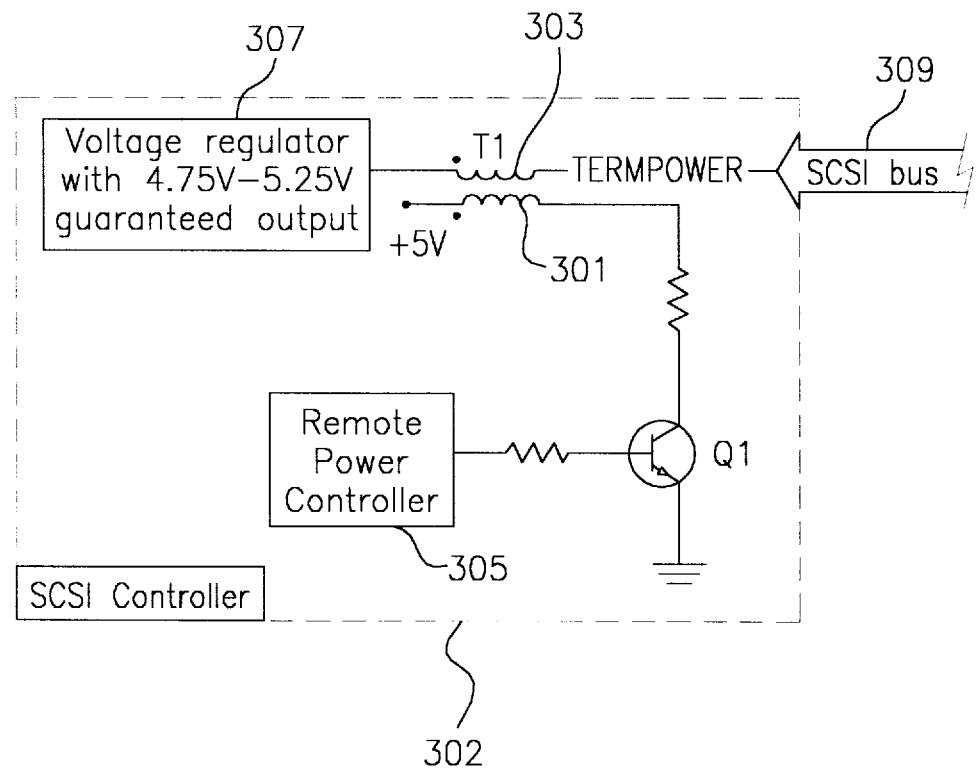
FIG. 3A and FIG. 3B, hereinafter referred together as "FIG. 3", show one preferred embodiment of the invention.
Figure 3B:
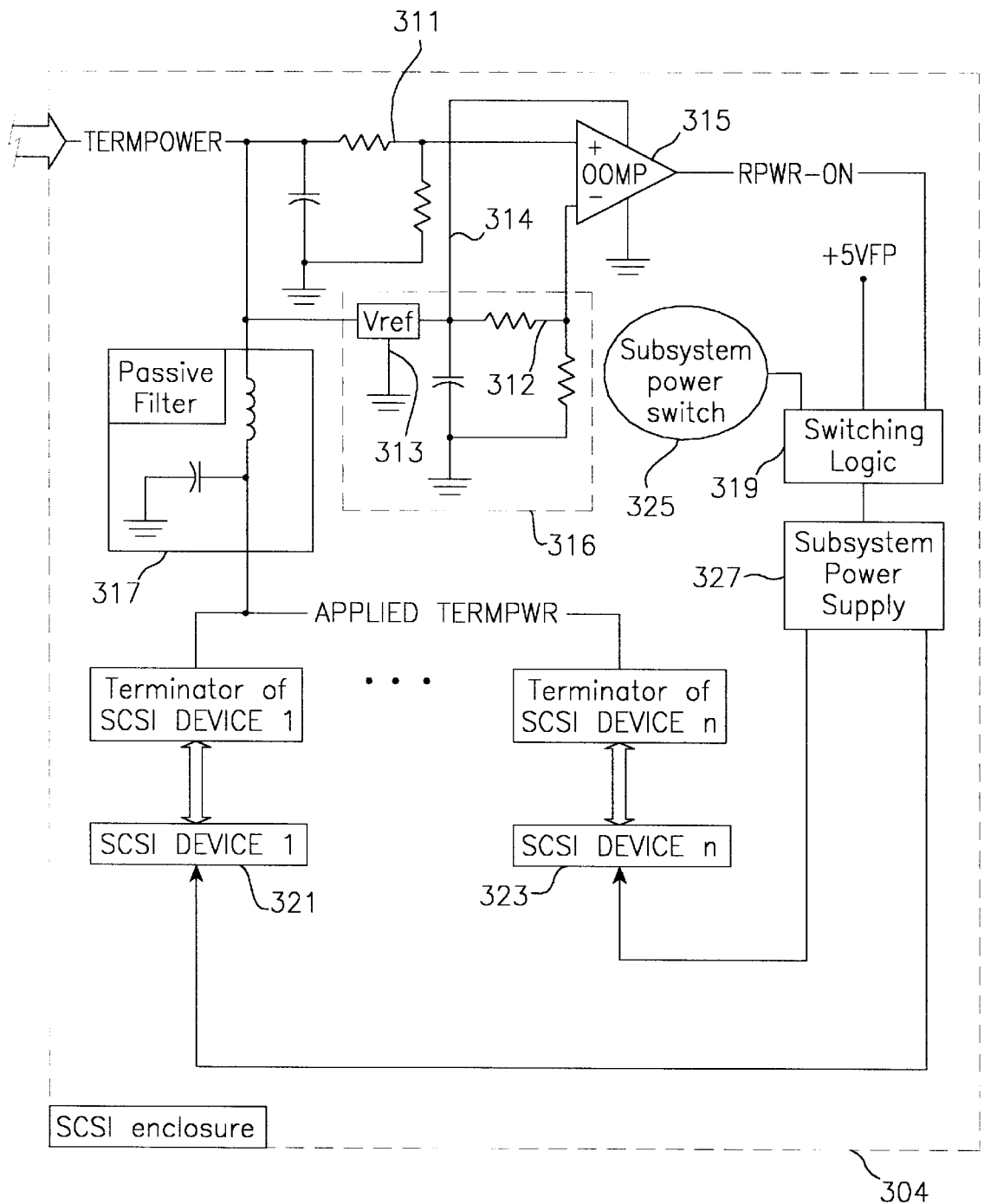

Referring now to FIGS. 3A and 3B, one preferred embodiment of the invention is shown. Transistor Q1 is biased such that a TTL swing at the base of the transistor causes the coil primary 301, connected to the collector of Q1 to create an AC superposition in the coil's secondary 303. That approach may be preferred over a voltage divider because the voltage regulator can provide up to 1.5 A and resistive losses can be significant. The voltage regulator 307 in a preferred embodiment, is guaranteed to output a voltage within the range of 4.75 V to 5.25 V. Remote power control logic 305 is coupled to the base of transistor Q1 to control the superposition of the pulse. In the embodiment described herein, the remote power control logic is controlled within the SCSI controller 302, and controls Q1 such that setting Q1 on, causes a negative going pulse on the TERMPWR line for a predetermined amount of time, e.g., 0.25 microseconds. In one implementation, remote power control logic 305 may provide a pulse (e.g., square wave or sine wave) to Q1. The specific pulse widths may vary according to the intended applications. Also more complicated signaling protocols can be utilized to communicate more complex information. The more complex the signal protocols, the more intelligence required for the remote power controller 305, as well as the detection circuitry receiving the communication signal.

TERMPWR is supplied over a standard SCSI bus 309 to the terminators of SCSI devices 321 through 323 which are contained in SCSI enclosure 304. The SCSI devices are also connected to the remaining signal lines of the SCSI bus although the connection is not shown.

Additionally TERMPWR is coupled to comparator 315. A voltage divider network 311 is used to divide the TERMPWR voltage down to a lower voltage level. TERMPWR is also coupled to a reference voltage circuit 316. Reference voltage circuit 316 includes a three terminal reference voltage circuit 313 which provides a first reference voltage which is supplied to the comparator as the comparator supply voltage. In other embodiments, the comparator may receive a supply and reference voltage from other sources, e.g., flea power. The reference voltage circuit also includes voltage divider 312 which receives the first reference voltage and provides the reference voltage to comparator 315 which is compared to the voltage divided TERMPWR in comparator 315 to detect the AC swing. Because the SCSI specification allows the voltage to be as low as 4.25 V and the voltage regulator is guaranteed to provide 4.75 V, a swing of 0.5 V can be used to signal a power on. Depending upon the pulse duration and filtering, this swing can be adjusted. Note that in the implementation shown, a simple RC filter is used in voltage dividers 311 and 312. Better filtering can lead to a smaller AC swing being utilized and more immunity from noise spikes. The RC filter should be set so that noise spikes smaller than the selected pulse width, e.g., 0.25 microseconds, are filtered out. That is, the RC filter is set so that the knee frequency response reduces a noise spike of less than the minimum pulse width, e.g., less than 0.25 microseconds, by at least 3 dB.

The output of comparator 315 is tied to the switching logic 319 as an OR function of the subsystem power switch 325 with the control RPWR-ON from comparator 315. The signal +5VFP (Flea Power) is also supplied to switching logic 319 in the embodiment shown. Switching logic 319 would then cause subsystem power supply 327 to turn on and supply SCSI devices 1 through n with power. Those devices would then be ready to receive further communications over the SCSI bus from the controller. Note that the only added cost is due to the comparator with built-in or external Vref, Q1, resistors capacitors and inductors.

In order to remove any close margins on the low voltage side, an LC passive filter 317 is added in series with TERMPWR to create an APPLIED TERMPWR to the SCSI terminators to filter out the short pulse duration.

Even more advanced features can be implemented by this sideband signal path such as communication over a dead SCSI bus. For example, server management information is now being sent via SCSI commands and the SAF-TE or SES protocols. When a catastrophic server failure occurs, embedded server management can no longer communicate server management data to determine if a server reboot is possible. By using this low bandwidth side band path, some level of information can still be communicated even though the host SCSI controller is no longer operational. However, for such cases, more sophisticated and elaborate filtering mechanism and signaling protocols may be required.

The description of the invention set forth herein is illustrative, and is not intended to limit the scope of the invention as set forth in the following claims. For instance, while the invention has been described specifically with a SCSI bus implementation, the invention is also applicable to other buses which specify a distributed power supply line. Variations and modifications of the embodiments disclosed herein, may be made based on the description set forth herein, without departing from the scope and spirit of the invention as set forth in the following claims.

What is claimed is:

1. In an interface including signaling lines and a power supply line which is specified to operate within a first voltage range, and wherein the power supply line normally operates at a first voltage within a second voltage range, the second voltage range being within the first voltage range, a method of communicating from a first device to another device over the power supply line, comprising the steps of:

causing the power supply line to be at a second voltage within the first voltage range and outside the second voltage range, for a predetermined interval, according to a control signal;

determining if the power supply line voltage is at the second voltage in a voltage comparator; and providing an indication signal when the power supply line is at the second voltage.

2. A method as recited in claim 1 wherein determining if the power supply line is at the second voltage includes the steps of:

providing the power supply line voltage to a first voltage divider circuit and generating a reduced power supply line voltage;

providing the power supply line voltage to a reference voltage circuit and outputting a reference voltage;

comparing the reference voltage to the reduced power supply line voltage in a voltage comparator to determine if the second voltage is present on the power supply line; and asserting the indication signal from the voltage comparator when the comparing step indicates that the second voltage is present on the power supply signal line.

3. A method as recited in claim 2, further comprising the step of:

supplying the indication signal to a logic circuit controlling a power supply circuit to cause the power supply circuit to supply power to a device connected on the interface.

4. A method as recited in claim 2, further comprising the steps of:

producing a first reference voltage in the reference voltage circuit;

supplying the first reference voltage to the comparator as a supply voltage; and voltage dividing the first reference voltage to produce the reference voltage.

5. A method as recited in claim 1 wherein the power supply line is specified to operate at a DC voltage.

6. The method as recited in claim 1 wherein the power supply line is a SCSI TERMPWR line.

7. The method as recited in claim 1, wherein the first voltage range is between 4.25 and 5.25 volts and the second voltage range is between 4.75 volts and 5.25 volts.

8. A method as recited in claim 1 wherein the indication signal is a remote power enablement signal sent from the first device to the other device.

9. A method as recited in claim 1 further comprising the steps of:

filtering the power supply line in a passive filter including an inductor and a capacitor to generate a filtered power supply line signal; and providing the filtered power supply line signal to a terminator on the interface.

10. A method as recited in claim 1 wherein the method of communicating is from the first device to at least one other device on the interface and wherein interface logic coupling the second device to the signaling lines of the interface is inoperative.

11. A method as recited in claim 1 wherein the step of causing the power supply line to be at the second voltage, includes changing a voltage on a primary of a transformer, to cause an AC superposition on a secondary of the transformer, the secondary being coupled to the power supply line.

12. An apparatus for communicating from a first device to another device, comprising:

a power supply line defined as a line in an interface including signaling lines and the power supply line, the power supply line being specified to operate in a first voltage range and normally operating at a first voltage within a second voltage range, the second voltage range being within the first voltage range; and a voltage circuit for changing the power supply line to a second voltage according to a control signal, the second voltage being outside of the second voltage range and within the first voltage range, the voltage circuit including, a transistor switch whose base is coupled to the control signal;

a primary of a transformer coupled to the collector of the transistor switch, and a secondary of the transformer coupled to the voltage supply line.

13. An apparatus as recited in claim 12 wherein the transistor switch is biased so that a TTL swing at the base of the transistor causes the primary of the transformer to create an AC superposition in the secondary; thereby causing the power supply line to be at the second voltage.

14. An apparatus for communicating between a first device and at least one other device, comprising:

a power supply line specified to operate in a first voltage range and normally operating at a first voltage within a second voltage range, the second voltage range being within the first voltage range, the power supply line being part of an interface which includes signaling lines and the power supply line;

a voltage circuit for changing the power supply line to a second voltage according to a control signal, the second voltage being outside of the second voltage range and within the first voltage range;

a voltage detecting circuit, including a voltage comparator, coupled to the power supply line for asserting a detection signal indicating when the second voltage is present on the power supply line, thereby providing communication between the first device and the at least one other device.

15. An apparatus as recited in claim 14 further comprising:

a switching logic circuit, responsive to the detection signal, for providing power to a device on the interface.

16. An apparatus as recited in claim 14 wherein the voltage circuit for changing the power supply line to a second voltage comprises:

a transistor switch whose base is coupled to a control signal;

a primary of a transformer coupled to the collector of the transistor switch; and a secondary of the transformer coupled to the voltage supply line.

17. An apparatus as recited in claim 16 wherein the transistor switch is biased so that a TTL swing at the base of the transistor causes the primary of the transformer to create an AC superposition in the secondary.

18. An apparatus as recited in claim 14 wherein the power supply line is a SCSI TERMPWR line.

19. An apparatus as recited in claim 14 wherein the first voltage range is between 4.25 and 5.25 volts and the second voltage range is between 4.75 volts and 5.25 volts.

20. An apparatus as recited in claim 14 wherein the power supply line is specified to operate at a DC voltage.

21. An apparatus as recited in claim 14 wherein the voltage detecting circuit comprises:

a voltage divider circuit for dividing the voltage on the power supply line and generating a voltage divided power supply line voltage;

a reference voltage circuit coupled to the power supply line and providing a reference voltage signal; and the comparator coupled to the voltage divided power supply line voltage and the reference voltage signal, the comparator asserting the signal indicating when the second voltage is present on the power supply line.

22. An apparatus as recited in claim 21 wherein, the reference voltage circuit provides a first reference voltage coupled to the comparator as a supply voltage; and wherein the reference voltage circuit includes a voltage divider circuit connected to the first reference voltage to produce the reference voltage.

23. An apparatus as recited in claim 14 wherein the detection signal is a remote power enablement signal sent from the first device.

24. An apparatus as recited in claim 14, further comprising:
   a passive filter, including an inductor and a capacitor, coupled to the power supply line and providing a filtered power supply line to the at least one other device.

25. An apparatus as recited in claim 24 wherein the filtered power supply line is coupled to a terminating circuit of the at least one other device.

26. An apparatus for receiving a communication from a first device coupled to a communication bus which includes signaling lines, comprising:
   a power supply line received from the first device, the power supply line being specified as part of the communication bus and specified to operate within a first voltage range, the power supply line normally operating at a first voltage within a second voltage range, the second voltage range being within the first voltage range; and
   a voltage detecting circuit, including a voltage comparator, coupled to the power supply line for asserting a detection signal indicating when the first device changes the power supply line to a second voltage, the second voltage being outside of the second voltage range and within the first voltage range.

27. An apparatus as recited in claim 26 wherein the voltage detecting circuit comprises:
   a voltage divider circuit for dividing the voltage on the power supply line and generating a voltage divided power supply signal voltage;
   a reference voltage circuit coupled to the power supply line and outputting a reference voltage signal; wherein the comparator is coupled to the voltage divided power supply signal voltage and the reference voltage signal, the comparator asserting the signal indicating when the second voltage is present on the power supply line.

28. An apparatus as recited in claim 27 wherein, the reference voltage circuit generates a first reference voltage which is coupled to the comparator as a supply voltage; and wherein the reference voltage circuit includes a voltage divider circuit coupled to the first reference voltage to produce the reference voltage.

29. An apparatus as recited in claim 28 wherein the detection signal is a remote power enablement signal sent from the first device.

30. An apparatus as recited in claim 29, further comprising:
   a passive filter including an inductor and a capacitor coupled to the power supply line and providing a filtered power supply line to a terminating circuit.

* * * * *